(12) United States Patent
Yen et al.

(10) Patent No.: US 11,295,910 B2
(45) Date of Patent: Apr. 5, 2022

(54) KEYBOARD STRUCTURE

(71) Applicants: LITE-ON ELECTRONICS (GUANGZHOU) LIMITED, Guangzhou (CN); LITE-ON TECHNOLOGY CORPORATION, Taipei (TW)

(72) Inventors: Ming-Fu Yen, Taipei (TW); Wei-Pin Chuang, Taipei (TW); Cheng-Hsiung Huang, Taipei (TW); Min-Chuan Shao, Taipei (TW); Han-Yang Hsu, Taipei (TW); Jian-Jhih Chen, Taipei (TW); Hsin-Fu Liu, Taipei (TW)

(73) Assignees: LITE-ON ELECTRONICS (GUANGZHOU) LIMITED; LITE-ON TECHNOLOGY CORPORATION

( * ) Notice: Subject to any disclaimer, the term of this patent is extended or adjusted under 35 U.S.C. 154(b) by 0 days.

(21) Appl. No.: 17/131,281

(22) Filed: Dec. 22, 2020

(65) Prior Publication Data
US 2021/0210293 A1 Jul. 8, 2021

Related U.S. Application Data

(60) Provisional application No. 63/035,893, filed on Jun. 8, 2020, provisional application No. 62/956,362, filed on Jan. 2, 2020.

(30) Foreign Application Priority Data

Oct. 27, 2020 (CN) .......................... 202011166603.0

(51) Int. Cl.
*H01H 13/83* (2006.01)
*H01H 13/705* (2006.01)

(52) U.S. Cl.
CPC .......... *H01H 13/83* (2013.01); *H01H 13/705* (2013.01); *H01H 2231/002* (2013.01)

(58) Field of Classification Search
CPC ...... H01H 3/125; H01H 13/705; H01H 13/14; H01H 13/70; H01H 13/704;
(Continued)

(56) References Cited

U.S. PATENT DOCUMENTS 6,323,445 B1 * 11/2001 Yee .................... H01H 13/702
200/305
2009/0103964 A1 * 4/2009 Takagi .................. H01H 3/125
400/495

(Continued)

*Primary Examiner* — Ahmed M Saeed
(74) *Attorney, Agent, or Firm* — Innovation Counsel LLP (57) ABSTRACT

A keyboard structure including a base, at least one key and an electronic element is provided. The key is disposed on the base and sequentially includes a cap, a limiting structure, an elastic member and a membrane switch from top to down, wherein the elastic member is disposed on the membrane switch, the cap is disposed on the elastic member, and the limiting structure connects the cap and the base, such that the cap is configured to move relative to the base in a vertical direction. The electronic element is disposed on the membrane switch and is surrounded by an electrostatic protection zone, wherein the membrane switch has a hole corresponding to the electrostatic protection zone.

17 Claims, 7 Drawing Sheets

(58) Field of Classification Search
CPC ........... H01H 13/7065; H01H 13/7006; H01H 13/7057; H01H 13/78; H01H 13/79; H01H 13/52; H01H 13/703; H01H 13/507; H01H 13/83; H01H 2219/062; H01H 2219/039; H01H 13/023; H01H 2219/06; H01H 2221/07; H01H 9/181; H01H 2219/036; H01H 2219/044; H01H 2013/026; H01H 9/161; H01H 2219/0622; H01H 2219/037; H01H 13/10
See application file for complete search history.

(56) References Cited

U.S. PATENT DOCUMENTS

2012/0298491 A1\* 11/2012 Ozias .................... G06F 1/1662
200/314
2020/0070543 A1\* 3/2020 Hung .................... G06F 3/0202

\* cited by examiner

KEYBOARD STRUCTURE

This application claims the benefits of U.S. provisional application Ser. No. 62/956,362, filed Jan. 2, 2020, U.S. provisional application Ser. No. 63/035,893, filed Jun. 8, 2020, and People's Republic of China application Serial No. 202011166603.0, filed Oct. 27, 2020, the subject matters of which are incorporated herein by reference.

BACKGROUND OF THE INVENTION

Field of the Invention

The invention relates in general to a keyboard structure, and more particularly to a keyboard structure with electrostatic protection.

Description of the Related Art

The conventional method avoids the electronic elements inside a keyboard being damaged by electrostatic discharges (ESD) through the configuration of a certain number of conductive members inside the keyboard to guide electrostatic discharges accumulated on the casing surface to the ground end, or through the configuration of extra conducting wires to leak away an instantaneous high current. Since such electrostatic protection mechanisms cannot completely cover the entire keyboard, electrostatic protection will deteriorate. Particularly for the keyboard with light keys, since the membrane disposed under each light key may prevent the discharge of the instantaneous high current, the electric current will directly drift to the light source and may cause damages.

SUMMARY OF THE INVENTION

The invention is directed to a keyboard structure capable of improving electrostatic protection in the surroundings of an electronic element.

According to one embodiment of the present invention, a keyboard structure including a base, at least one key and an electronic element is provided. The key is disposed on the base and sequentially includes a cap, a limiting structure, an elastic member and a membrane switch from top to down, wherein the elastic member is disposed on the membrane switch, the cap is disposed on the elastic member, and the limiting structure connects the cap and the base, such that the cap can move relative to the base in a vertical direction. The electronic element is disposed on the membrane switch and is surrounded by an electrostatic protection zone, wherein the membrane switch has a hole corresponding to the electrostatic protection zone.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the principles of the structure and operation of the present invention are disclosed below with accompanying drawings.

Figure 1:
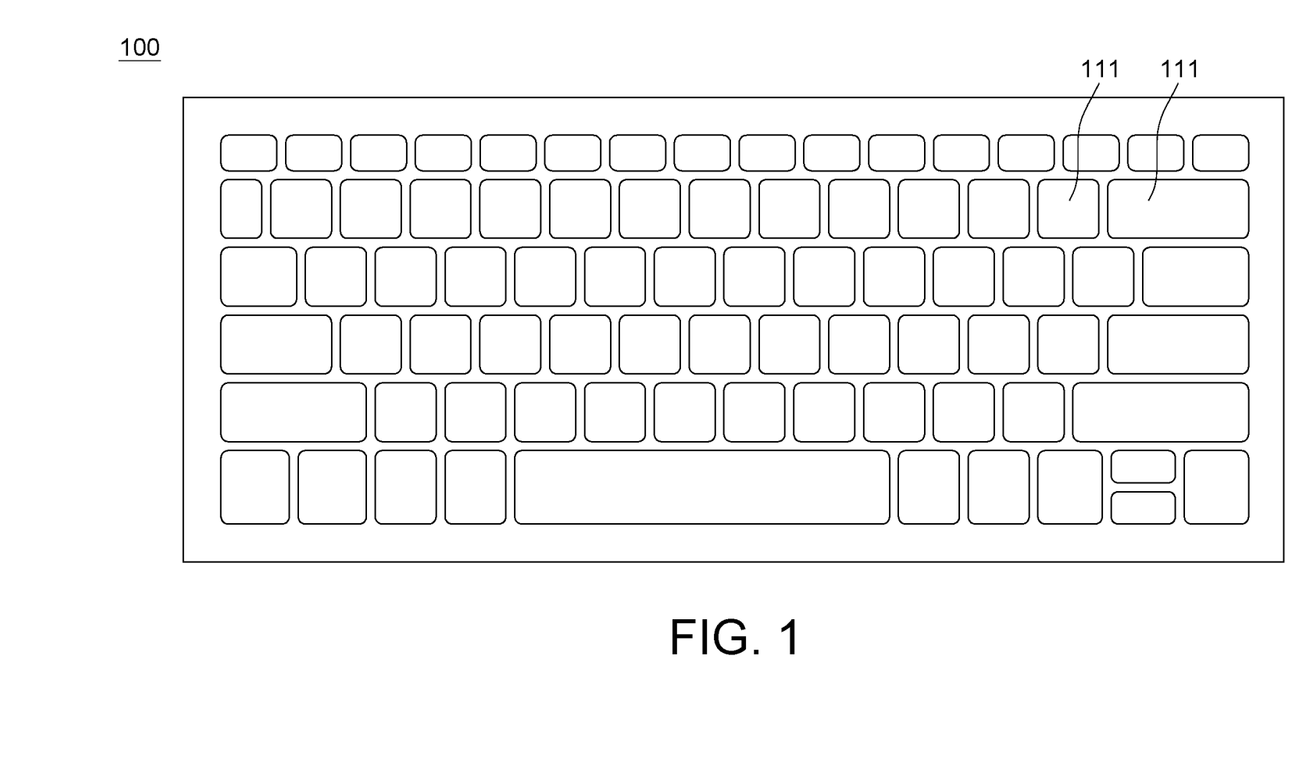
FIG. 1 is a schematic diagram of an appearance of a keyboard structure according to an embodiment of the present invention.
Figure 2A:
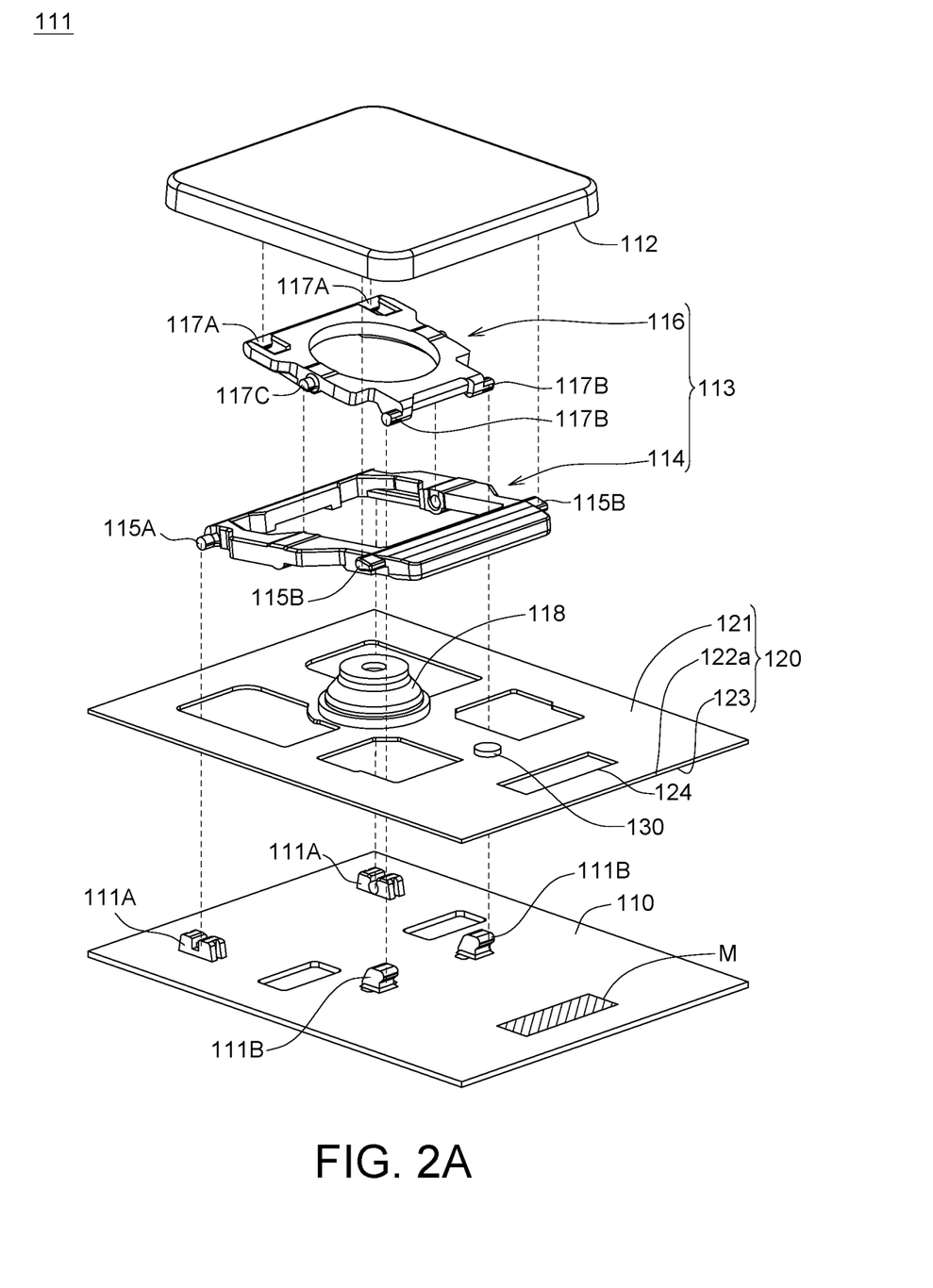
FIG. 2A is an explosion diagram of a key of a keyboard structure according to an embodiment of the present invention.
Figure 2B:
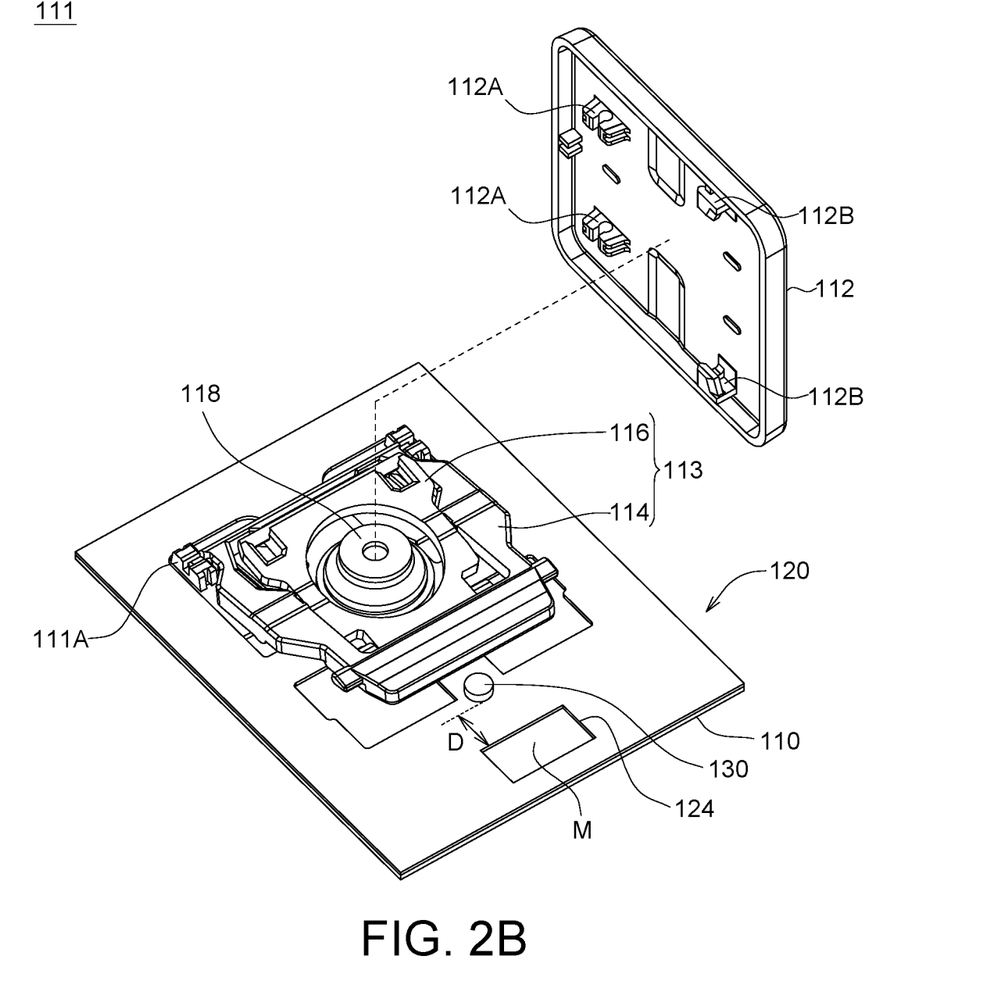
FIG. 2B is an assembly diagram of a key of a keyboard structure according to an embodiment of the present invention.
Figure 3:
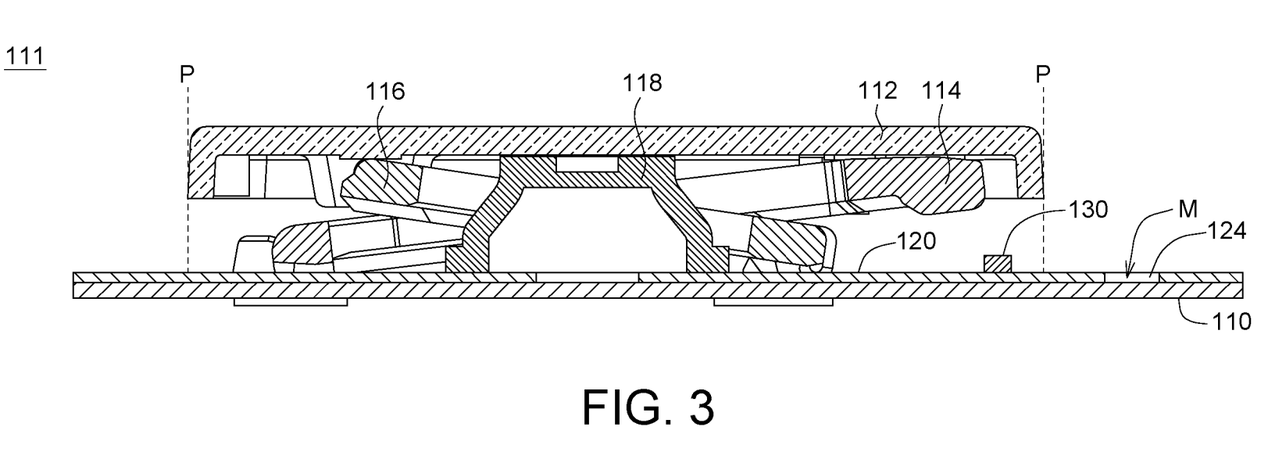
FIG. 3 is a cross-sectional view of a key of a keyboard structure according to an embodiment of the present invention.

FIG. 1 is a schematic diagram of an appearance of a keyboard structure 100 according to an embodiment of the present invention. FIG. 2A is an explosion diagram of a key 111 of a keyboard structure 100 according to an embodiment of the present invention. FIG. 2B is an assembly diagram of a key 111 of a keyboard structure 100 according to an embodiment of the present invention. FIG. 3 is a cross-sectional view of a key 111 of a keyboard structure 100 according to an embodiment of the present invention. Refer to FIG. 1, FIG. 2A, FIG. 2B and FIG. 3. In an embodiment, the keyboard structure 100 includes a base 110 and a plurality of keys 111 disposed on the base 110. Each of the keys 111 can be a letter key, a number key, a symbol key, a function key or an indicator key. Additionally, the keyboard structure 100 can be a wireless keyboard, a gaming keyboard, a backlit keyboard, a touch keyboard, an ultra-thin flat keyboard or an optical axis keyboard, and the present invention is not limited thereto.

The keys 111 are separated from each other, and each of the keys 111 can move relative the base 110 in a vertical direction to generate a pressing signal. Each of the keys 111 sequentially includes a cap 112, a limiting structure 113, an elastic member 118 and a membrane switch 120 from top to down. Besides, the keyboard structure 100 further includes at least one electronic element 130, such as light emitting diodes (LEDs) or an optical switch or a sensor, disposed on the membrane switch 120.

In an embodiment, the light emitting diode (LED) element can be used as a light source of the key 111 to indicate the power state or signal state of the keyboard. The optical switch further includes an emitter and a receiver. The emitter can be an infrared emitter or a visible light emitter. The receiver can be an infrared receiver or a visible light receiver. The emitter is used to emit an optical signal. The receiver is used to receive an optical signal from the emitter. When the optical signal is blocked by the light shielding portion of the key 111, the optical switch correspondingly generates an electrical signal to the membrane switch 120 to obtain a pressing signal of the key 111.

Refer to FIGS. 2A and 2B. A first limiting unit 111A and a second limiting unit 111B are disposed on the base 110 to connect the limiting structure 113. The limiting structure 113 includes a first supporting member 114 and a second supporting member 116. The first limiting unit 111A and the second limiting unit 111B can be formed by plastic injection molding or integrally formed in one piece with the base 110 by stamping the metal base 110. Moreover, a third limiting unit 112A and a fourth limiting unit 112B, which can be formed by plastic injection molding, are disposed on the underside of the cap 112 to connect the first supporting member 114 and the second supporting member 116.

Refer to FIGS. 2A and 2B. One end of the first supporting member 114 has a first fixing shaft 115A, and the other end of the first supporting member 114 has a first sliding shaft 115B. Furthermore, one end of the second supporting member 116 has a second fixing shaft 117A, and the other end of the second supporting member 116 has a second sliding shaft 117B. In an embodiment, the first fixing shaft 115A rotatably and pivotally connects the first limiting unit 111A, the first sliding shaft 115B slidably connects the fourth limiting unit 112B; the second fixing shaft 117A rotatably and pivotally connects the third limiting unit 112A; and the second sliding shaft 117B slidably connects the second limiting unit 111B. However, the first fixing shaft 115A and the first sliding shaft 115B are interchangeable, and the second fixing shaft 117A and the second sliding shaft 117B are also interchangeable. In the present invention, the first supporting member 114 and the second supporting member 116 are not limited to the design of one side fixing and one side sliding. Alternatively, the two ends of the first supporting member 114 can rotatably connect the cap 112 and the base 110, but the two ends of the second supporting member 116 can slidably connect the cap 112 and the base 110, and the present invention is not limited thereto.

Additionally, the first supporting member 114 and the second supporting member 116 are connected by a rotation shaft 117C, such that the first supporting member 114 and the second supporting member 116 can rotate relatively around the rotation shaft 117C. However, the first supporting member 114 and the second supporting member 116 also can be independent supporting members, and do not have to be connected by the rotation shaft 117C as exemplified above.

In an embodiment, the first supporting member 114 and the second supporting member 116 can form an ultra-thin and flat scissor foot structure, wherein the first supporting member 114 can be an outer frame and the second supporting member 116 can be an inner frame. The design of receiving the second supporting member 116 in the first supporting member 114 saves the internal space of the key 111, such that the overall height of the keyboard structure 100 with several keys 111 will be reduced when the keyboard structure 100 is compressed. Thus, the conventional problem of the height of the keyboard being too large can be resolved, and the user can use an optimized keyboard on an ultra-thin or desktop computer.

Additionally, the elastic member 118 is interposed between the base 110 and the cap 112. The elastic member 118 can vertically move in a hollowed area surrounded by the first supporting member 114 and the second supporting member 116 to provide the compressed cap 112 with an elastic restoring force. In an embodiment, the elastic member 118, which can be formed of a rubber or a metal piece, is disposed on the membrane switch 120. The membrane switch 120 has a patterned opening, which allows the first limiting unit 111A and the second limiting unit 111B disposed on the base 110 to pass through.

Refer to FIG. 2A, FIG. 2B and FIG. 3. The electronic element 130 is disposed on the membrane switch 120. The membrane switch 120, such as a flexible circuit board, includes a first membrane 121, an adhesive layer 122a and a second membrane 123. The adhesive layer 122a is located between the first membrane 121 and the second membrane 123 to form a gap layer, such that an electrical contact on the first membrane 121 and an electrical contact on the second membrane 123 are separated from each other and will not generate unnecessary contact. When the user presses the keys 111, the elastic member 118 compresses the membrane switch 120 and causes the two electrical contacts, which are opposite to each other, to come into contact and become conducted to generate a pressing signal. In the present embodiment, the adhesive layer 122a, such as a waterproof adhesive layer, avoids vapor or moisture entering the membrane switch 120, hence achieving a waterproof effect.

Since the first membrane 121 and the second membrane 123 both are insulating and are unable to conduct electricity and guide the static electricity of the keyboard surface to the ground through the first membrane 121 and the second membrane 123, electrostatic protection may deteriorate. In the present embodiment, the dummy area or the non-wiring area of the membrane switch 120 (or flexible circuit board) has a hole 124. The hole 124 is adjacent to the electronic element 130 and exposes a surface M of the base 110 to form an electrostatic protection zone. The base 110 can be formed of metal. The metal surface M of the base 110 is interconnected with the ground of the keyboard structure 100, such that the instantaneous high current will be leaked away instead of drifting to the electronic element 130 and causing damage of the electronic element 130.

In the present embodiment, the hole 124 can pass through the first membrane 121 and the second membrane 123, and the adhesive layer 122 can form an enclosed area, such as a waterproof ring, surrounding the hole 124 to avoid vapor or moisture entering the membrane switch 120, hence achieving a waterproof effect.

Besides, the position of the hole 124 can be adjusted according to the position of the electronic element 130. For example, when the position of the electronic element 130 is correspondingly located at the top right of the key 111, the position of the hole 124 can be moved to the top right of the key 111; when the position of the electronic element 130 is correspondingly located at the top left of the keys 111, the position of the hole 124 can be moved to the top left of the keys 111. As indicated in FIG. 2B, the position of the hole 124 can be determined according to the shortest distance D between the hole 124 and the electronic element 130. The shortest distance D can be less than or equivalent to 5 mm, but the invention is not limited to the said exemplification. That is, the hole 124 corresponding to the electrostatic protection zone can be located in an extending direction of the shortest distance D between the electronic element 130 and the cap edge.

Figure 5:
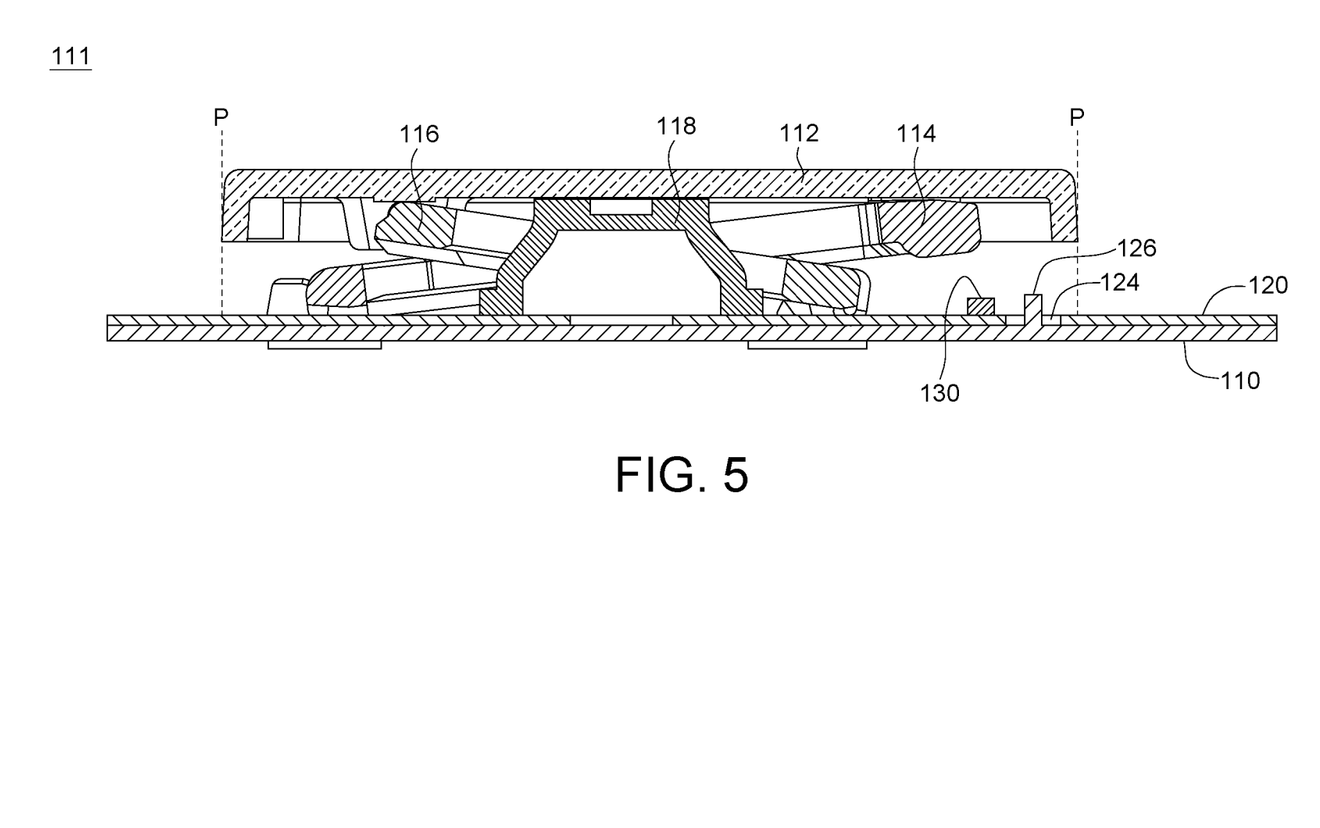
FIG. 5 is a cross-sectional view of a key of a keyboard structure according to an alternate embodiment of the present invention.

Besides, the position of the hole 124 can be selectively located between two keys 111, inside a key 111 or outside a key 111. As indicated in FIG. 3, when the position of the hole 124 is located between two keys 111 or is not inside the key 111, the hole 124 does not overlap the orthographic projection P of the cap 112. As indicated in FIG. 5, when the position of the hole 124 is located inside the key 111, the hole 124 overlaps the orthographic projection P of the cap 112. The hole 124 can have a circular shape, a quadrilateral shape, a long-bar shape or an irregular shape. The hole 124 can have a width between 5 mm-10 mm, a length greater than 10 mm, and an aspect ratio of 2:1 or 4:1, and the present invention is not limited thereto. In an embodiment, the size and position of the hole 124 are determined according to the location of electrostatic discharge test points, and the number of holes 124 can be one or more. For example, when the electrostatic discharge test points are located at the top right, the right, and the bottom right of the electronic element 130, a plurality of holes 124 can be correspondingly formed at the top right, the right, and the bottom right of the electronic element 130 to form several electrostatic protections zones to enhance the electrostatic protection at the surroundings of the electronic element 130. The shorter the distance between the hole 124 and the electronic element 130, the better the electrostatic protection of the electronic element 130. When a plurality of holes 124 is provided, the holes 124 can be located on at least two adjacent sides of the electronic element 130.

Figure 4:
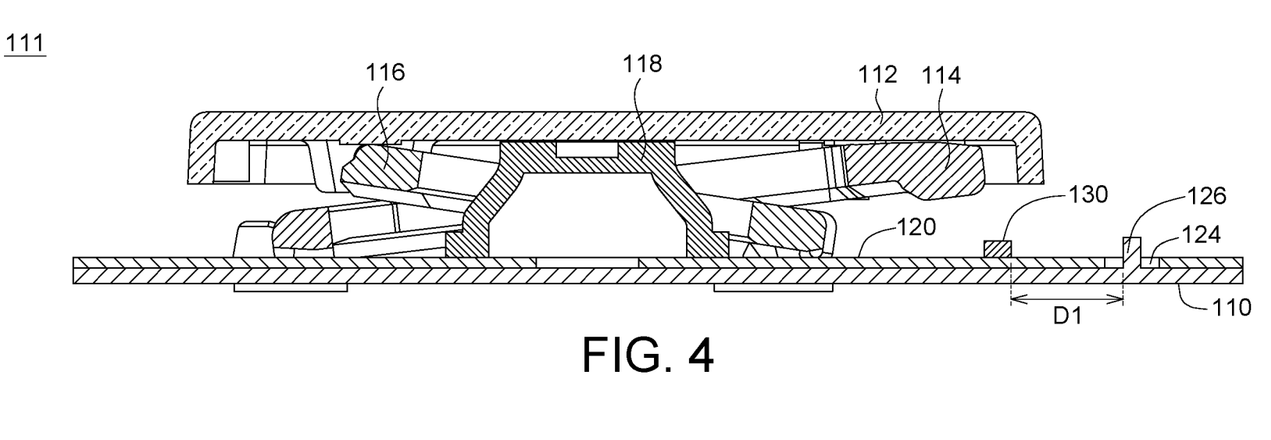
FIG. 4 is a cross-sectional view of a key of a keyboard structure according to another embodiment of the present invention.

Refer to FIG. 4. In another embodiment, the keyboard structure 100 further includes a metal column 126 disposed in the hole 124 and protruded from the base 110, such that the hole 124 can expose the metal surface. The position of the metal column 126 can be determined according to the shortest distance D1 between the metal column 126 and the electronic element 130. The shortest distance D1 can be less than or equivalent to 5 mm, but the invention is not limited to the said exemplification.

Moreover, the metal column 126 can be soldered on the surface of the base 110 or integrally formed in one piece with the base 110. The metal column 126 can be protruded from the surface of the base 110 by stamping or bending the base plate, such that the metal column 126 can be relatively higher than the surface of the base 110. The metal column 126 can be exposed in the hole 124 and can be higher than or lower than the electronic element 130. When the metal column 126 is higher than or substantially flush with the electronic element 130, a better electrostatic protection effect can be achieved. In the present embodiment, the metal column 126 can form an electrostatic protection zone (or protection wall) surrounding the electronic element 130. The metal column 126 is interconnected with the ground of the keyboard through the base 110, such that the instantaneous high current will be leaked away instead of drifting to the electronic element 130 and causing damage of the electronic element 130.

Moreover, the metal column 126 can have a quadrangular shape, a cylindrical shape, a flake shape, a long-bar shape or an irregular shape. The metal column 126 can have a width between 5 mm-10 mm, a length greater than 10 mm and an aspect ratio of 2:1 or 4:1, and the present invention does not have specific restrictions regarding the said exemplification. In an embodiment, the size and position of the metal column 126 are determined according to the location of electrostatic discharge test points, and the number of metal columns 126 can be one or more. For example, when the electrostatic discharge test points are located at the top right, the right, and the bottom right of the electronic element 130, a plurality of metal columns 126 can be correspondingly formed at the top right, the right, and the bottom right of the electronic element 130 to form several electrostatic protections zones to enhance the electrostatic protection a the surroundings of the electronic element 130. The shorter the distance between the metal column 126 and the electronic element 130, the better the electrostatic protection of the electronic element 130. When a plurality of metal columns 126 is provided, the metal columns 126 can be located on at least two adjacent sides of the electronic element 130.

Refer to FIG. 5. In another embodiment, the keyboard structure 100 includes a metal column 126 located inside each of the keys 111, and the hole 124 of the membrane switch 120 is correspondingly located inside the key 111. That is, the metal column 126 and the hole 124 overlap the orthographic projection P of the cap 112 and cannot be seen from outside the keyboard. In an embodiment, the interval between the metal column 126 and the electronic element 130 is smaller, and the metal column 126 is lower than the underside of the compressed cap 112, such that the metal column 126 will not collide the cap 112 and make noises.

Figure 6A:
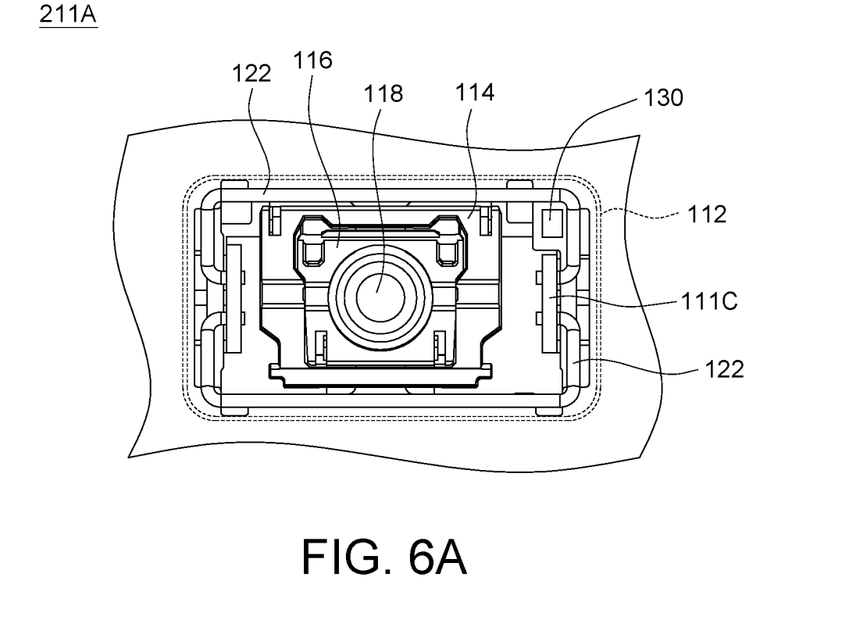
FIGS. 6A and 6B respectively are a top view and a side view of a key according to another embodiment of the present invention.
Figure 6B:
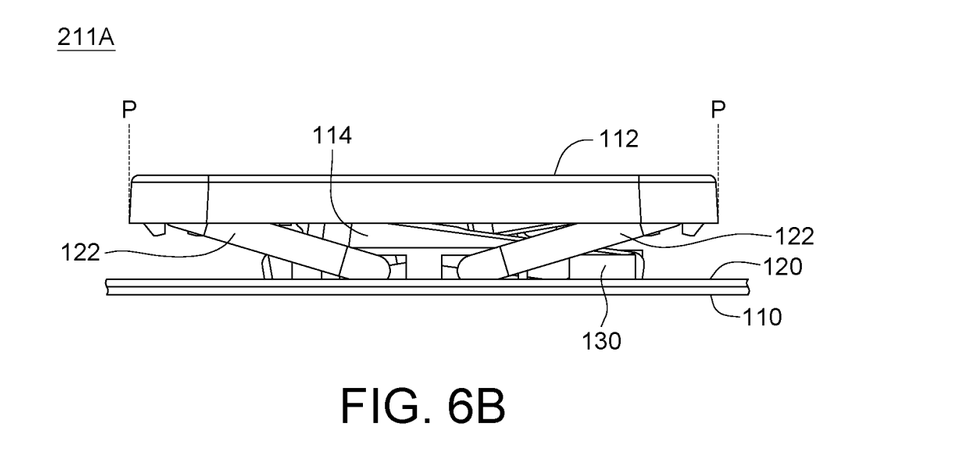

Refer to FIGS. 6A and 6B. In another embodiment, the key 211A can be a multiple key whose size is larger than the standard key, that is, the length of the cap 112 is basically larger than the width of the cap 112. Since the cap 112 of the present embodiment has a larger length and may wobble easily, the key 211A further includes two connecting rods 122 rotatably and pivotally connected between the base 110 and the cap 112, and the electronic element 130 is located in an area surrounded by the two connecting rods 122. One end of the connecting rods 122 connects the third limiting unit 111C disposed on the base 110, the other end connects the underside of the cap 112, and the connecting rods 122 are respectively disposed along the length direction of the cap 112 to provide the key 211A with compression stability in the length direction. The orthographic projections of the electronic element 130 and the connecting rods 122 on the base 110 will fall within the orthographic projection P of the cap 112, and the connecting rods 122 are located between the electronic element 130 and the edge of the cap 112 or between the electronic element 130 and the electrostatic discharge test points. The third limiting unit 111C can be integrally formed in one piece with the base 110 by stamping the metal base 110 and can pass through the hole 124 of the membrane switch 120. The two connecting rods 122, which can be formed of metal, form an electrostatic protection zone with the third limiting unit 111C to enhance the electrostatic protection surrounding the electronic element 130. Since the connecting rods 122, the third limiting unit 111C, and the base 110 are interconnected with the ground of the keyboard, the instantaneous high current will be leaked away instead of drifting to the electronic element 130 and causing damage of the electronic element 130.

Figure 7A:
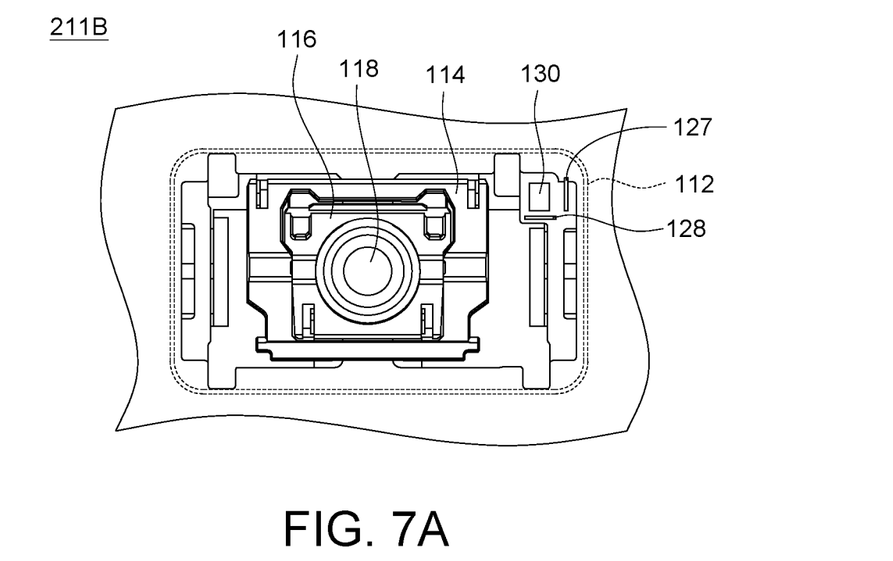
FIGS. 7A and 7B respectively are a top view and a side view of a key according to another embodiment of the present invention.
Figure 7B:
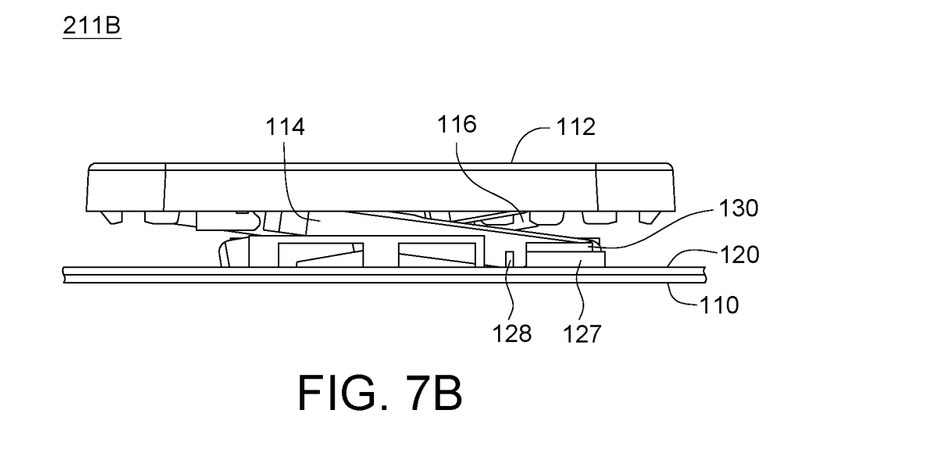

Refer to FIG. 7A and FIG. 7B. In another embodiment, each key 211B includes a first metal column 127 and a second metal column 128, or more metal columns. The first metal column 127 and the second metal column 128, which pass through the membrane switch 120 (or the flexible circuit board), are protruded from the top surface of the membrane switch 120 and are electrically connected to the surface of the base 110 to form an electrostatic protection zone (or protection wall) to enhance the electrostatic protection surrounding the electronic element 130. Thus, electrostatic charges will gather on the first metal column 127 or the second metal column 128 instead of directly drifting to the electronic element 130 and causing damage of the electronic element 130. The first metal column 127 and the second metal column 128 can be interconnected with or separated from each other. When a plurality of metal columns is provided, the metal columns can be located on at least two adjacent sides of the electronic element 130. In the present embodiment, the first metal column 127 and the second metal column 128 are separated and interest with each other at an angle of 90 degrees. However, the intersection angle between the first metal column 127 and the second metal column 128 is not limited to the said exemplification. The coverage of the first metal column 127 and the second metal column 128 (the extended length corresponding to one side of the electronic element 130) can be greater or equivalent to the length of the electronic element 130, such that the electrostatic protection of the outer side of the electronic element 130 can be enhanced. Moreover, like the metal column 126 as indicated in FIG. 5, the first metal column 127 and the second metal column 128 can be protruded from the surface of the base 110 by stamping or bending the base plate. Detailed descriptions are already disclosed above and are not repeated here.

The key as indicated in FIGS. 7A and 7B further includes two connecting rods 122 pivotally connected between the base 110 and the cap 112 as indicated in FIGS. 6A and 6B. Detailed descriptions are already disclosed above and are not repeated here. As indicated in FIG. 7A, the connecting rods (not illustrated) located between the electronic element 130 and the edge of the cap 112 are disposed on a side different from that of the first metal column 127 and the second metal column 128. That is, the connecting rods (not illustrated), the first metal column 127 and the second metal column 128 are respectively located on three adjacent sides of the electronic element 130, such that the electrostatic protection surrounding the electronic element 130 can be further enhanced.

The keyboard structure disclosed in above embodiments of the present invention has a hole and/or a metal structure (such as column or connecting rod) in the dummy area or the non-wiring area of the membrane switch (or flexible circuit board). The hole is adjacent to the electronic element and exposes a surface of the base or enables the metal column to be protruded from the surface of the base. In another embodiment, an electrostatic protection zone is formed in the surroundings of the electronic element to enhance the electrostatic protection surrounding the electronic element using the conductivity of the connecting rod/metal structure. Since the surface of the base is interconnected with the ground of the keyboard, the instantaneous high current will be leaked away instead of drifting to the electronic element and causing damage of the electronic element.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A keyboard structure, characterized in comprising:
   a base having a surface and an electrostatic protection zone disposed on the surface;
   at least one key disposed on the surface of the base, wherein the key sequentially comprises a cap, a limiting structure, an elastic member and a membrane switch from top to down; the elastic member is disposed on the membrane switch, the cap is disposed on the elastic member, and the limiting structure connects the cap and the base, such that the cap is configured to move relative to the base in a vertical direction; and
   an electronic element disposed on the membrane switch and surrounded by the electrostatic protection zone, wherein the membrane switch has a hole corresponding to the electrostatic protection zone to expose the base.

2. The keyboard structure according to claim 1, wherein the hole is adjacent to the electronic element and exposes a part of the surface of the base to form the electrostatic protection zone, the membrane switch is a flexible circuit board, and the membrane switch comprises a first membrane, an adhesive layer and a second membrane; the adhesive layer is located between the first membrane and the second membrane, and the hole passes through the first membrane and the second membrane.

3. The keyboard structure according to claim 1, wherein the hole is located between two keys or outside the key, such that the hole does not overlap an orthographic projection of the cap.

4. The keyboard structure according to claim 1, wherein the hole is located inside the key, such that the hole overlaps an orthographic projection of the cap.

5. The keyboard structure according to claim 1, wherein a number of the hole are more than one, and the holes are disposed on two adjacent sides of the electronic element.

6. The keyboard structure according to claim 1, wherein a shortest distance between the hole and the electronic element is less than or equivalent to 5 mm.

7. The keyboard structure according to claim 1, wherein the electrostatic protection zone is located in an extending direction of a shortest distance between the electronic element and an edge of the cap.

8. The keyboard structure according to claim 1, wherein the electronic element is a light emitting diode or an optical switch.

9. The keyboard structure according to claim 1, further comprising a metal column disposed in the hole and protruded from the base.

10. The keyboard structure according to claim 9, wherein the metal column is soldered on the surface of the base or is integrally formed in one piece with the base.

11. The keyboard structure according to claim 9, wherein a shortest distance between the metal column and the electronic element is less than or equivalent to 5 mm.

12. The keyboard structure according to claim 9, wherein the metal column is located between two of the keys or outside the key, such that the metal column does not overlap an orthographic projection of the cap, or the metal column is located inside the key, such that the metal column overlaps the orthographic projection of the cap.

13. The keyboard structure according to claim 9, wherein the metal column is higher than or substantially flush with the electronic element.

14. The keyboard structure according to claim 1, wherein the base is formed of metal, and the surface is a metal surface interconnected with a ground of the keyboard structure.

15. The keyboard structure according to claim 1, further comprising at least one connecting rod rotatably and pivotally connected between the base and the cap, and the electronic element is located inside an area surrounded by the at least one connecting rod formed of metal.

16. The keyboard structure according to claim 15, wherein one end of the connecting rod connects a limiting unit disposed on the base, another end connects with underside of the cap, the limiting unit and the base are integrally formed of metal in one piece, the limiting unit is located in the hole and protruded from the base, and the connecting rod and the limiting unit form the electrostatic protection zone.

17. The keyboard structure according to claim 1, further comprising at least two metal columns protruded from the membrane switch and electrically connected to the surface of the base, wherein the at least two metal columns are located on two adjacent sides of the electronic element.

* * * * *